Nov. 8, 1960 J. BRESLAV 2,959,445
GRAPPLES
Filed Aug. 26, 1959 2 Sheets-Sheet 1
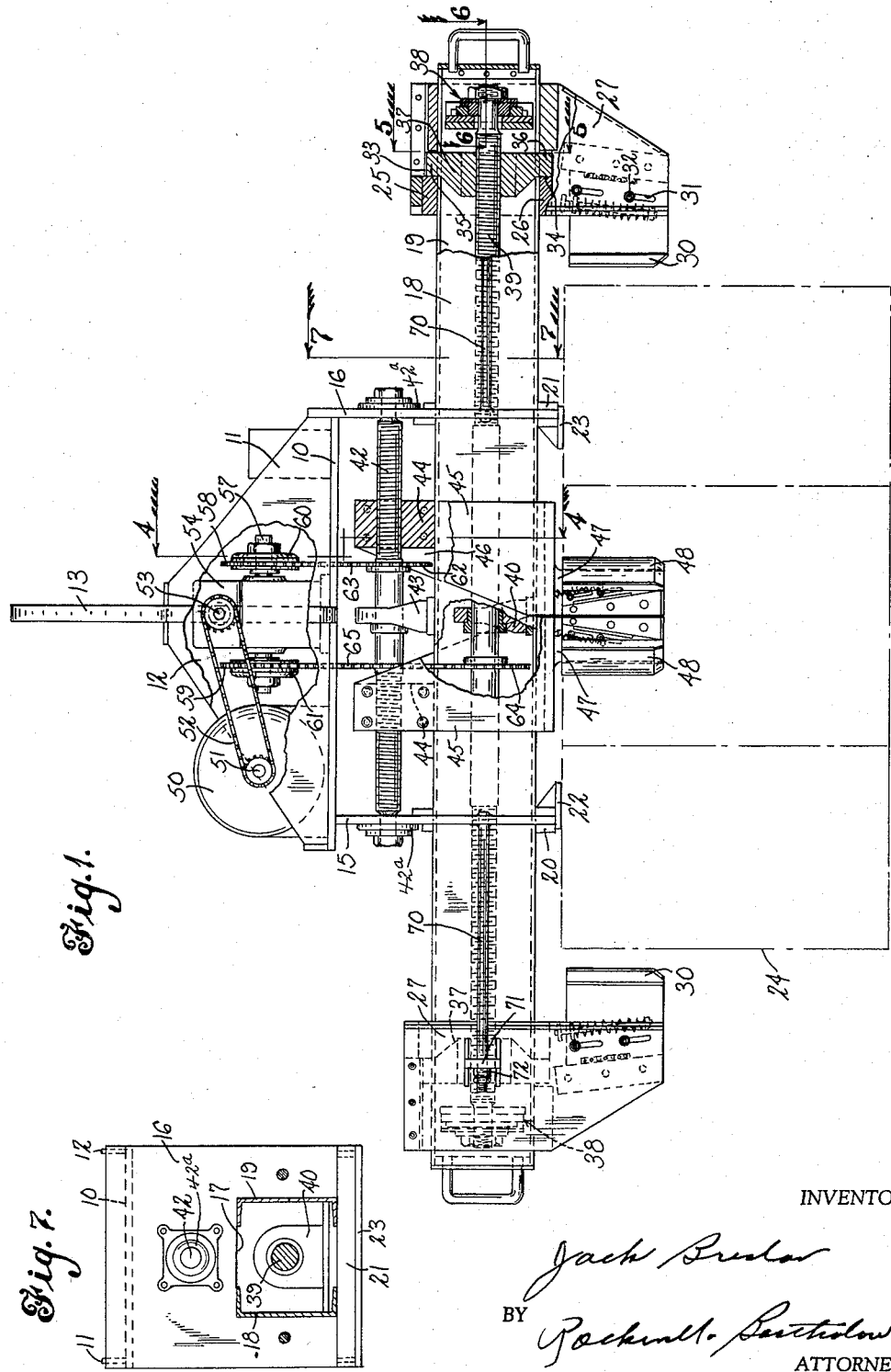
INVENTOR
Jack Breslav
BY Rockwell Bartholow
ATTORNEYS Nov. 8, 1960   J. BRESLAV   2,959,445
GRAPPLES
Filed Aug. 26, 1959   2 Sheets-Sheet 2
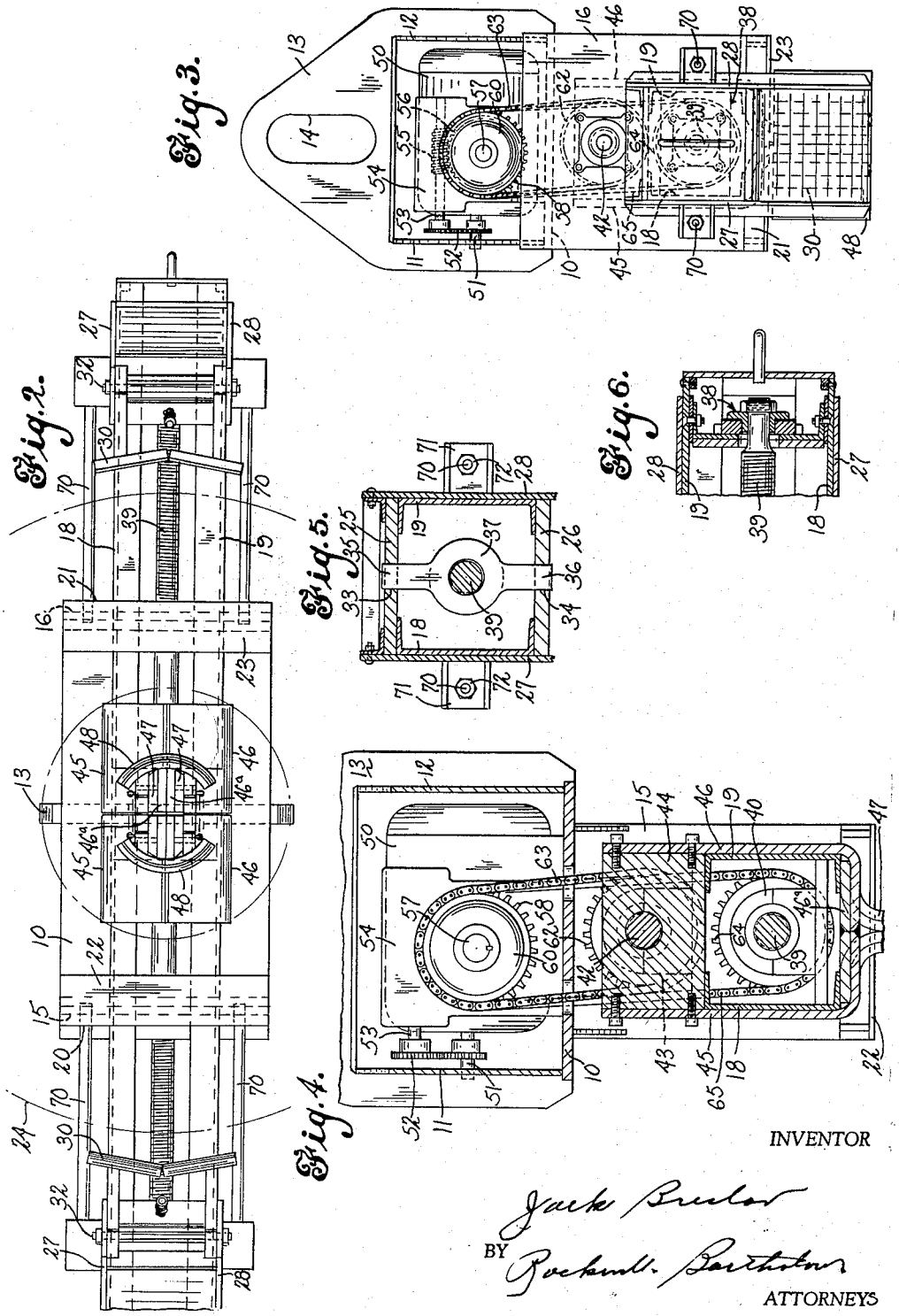
INVENTOR
Jack Breslav
BY
ATTORNEYS

United States Patent Office 2,959,445
Patented Nov. 8, 1960

2,959,445

GRAPPLES

Jack Breslav, 12 Vista Terrace, New Haven, Conn.

Filed Aug. 26, 1959, Ser. No. 836,295

7 Claims. (Cl. 294—86)

This invention relates to material-handling devices and more particularly to a grapple designed for use in lifting and transferring from place to place such articles as coils, for example. In handling of coils it is often desirable to grip the coil when the axis of the latter is in a vertical position and to grip both rims of the coil at the same time so that it may be transported without tilting. The same might apply to some articles other than coils wherein two parts of the article are to be simultaneously gripped.

In handling a coil, for example, where it is desired to grip both rims thereof, two sets of jaws are provided, namely an outer pair and an inner pair, one of the outer jaws cooperating with an associated one of the inner jaws to grip the rim of the coil. However, coils differ in thickness relatively to the axial opening therethrough and a difficulty arises in gripping each of the rims securely. Where, for example, the jaws are all mounted on one threaded rod or screw the inner jaws may bring up against the inner diameter of the coil before the outer jaws contact its outer surface. This will prevent further operation of the screw and, therefore, prevent the rim of the coil being tightly gripped. The same is true if separate screws are provided for the inner and outer jaws unless some provision is made for operation of one pair of jaws independently of the other so that, if the outer jaws, for example, first contact the coil, the movement of the inner jaws may be continued until they also contact the coil.

In the present instance an elongated beam is carried by a supporting member and slidably carried by this beam are a pair of outer jaws and a pair of inner jaws. A screw having right- and left-hand threads is rotatably mounted in the beam and threadedly connected adjacent each end with a nut carried by one of the outer jaws. A second screw having right- and left-hand threads is also rotatably carried by the frame which supports the beam member, which screw is threadedly connected with nuts carried by the inner jaws. A motor is positioned on the frame and driving connections are arranged from the motor shaft to each of the screws. Clutches are provided in each of these connections so that, if the movement of either pair of jaws is checked, the clutch will slip and movement of the other pair may be continued until both rims of the coil are securely gripped.

One object of the invention is to provide a new and improved grapple for handling coils or similar articles where two pairs of gripping jaws are employed.

Still another object of the invention is to provide a grapple having two pairs of gripping jaws, an outer pair and an inner pair, a single driving motor, and independent connections from said motor to the inner and outer jaws whereby one pair may be moved independently of the other in order to secure proper engagement of the jaws with the coil or other article to be lifted.

A still further object of the invention is to provide a structure of the character described wherein a friction clutch is provided in each of the connections between the motor and the inner and outer jaw members whereby movement of one pair of jaws may be continued when the other pair engages the coil or other article and the movement thereof is checked by such engagement.

To these and other ends the invention consists in the novel features and combinations of parts to be hereinafter described and claimed.

In the accompanying drawings:

Fig. 1 is a side elevational view with some parts being shown in section of a grapple embodying my invention;

Fig. 2 is a bottom plan view thereof;

Fig. 3 is a side elevational view of the grapple;

Fig. 4 is a sectional view on line 4—4 of Fig. 1;

Fig. 5 is a sectional view on line 5—5 of Fig. 1;

Fig. 6 is a sectional view on line 6—6 of Fig. 1; and

Fig. 7 is a sectional view on line 7—7 of Fig. 1.

To illustrate one embodiment of my invention I have shown a grapple comprising a frame consisting of a supporting plate 10 and a pair of upstanding side plates 11 and 12, one adjacent each edge of the supporting plate 10. A bail member 13 may be secured to the side plates and the supporting plate, which bail is provided with an opening 14 to receive the hook of a crane or other suspending means. The frame also includes a pair of depending plates 15 and 16 secured to the plate 10, these depending plates being provided with openings 17 extending through the lower edge thereof.

A horizontally extending elongated beam is supported by the plates 15 and 16, this beam consisting of spaced U-shaped elements 18 and 19, the flat sides of which are positioned against the edges of the openings 17 and secured thereto. These members may be supported from below by transverse elements 20 and 21 to which are secured supporting shoes 22 and 23 designed to rest upon a coil or like article 24, as shown in Fig. 1, when the device is in use. It is understood that the members 18 and 19 thus rigidly secured together form a supporting beam for the two pairs of jaws.

A pair of outer jaws are slidably carried by the beam member, one adjacent each end thereof, and as they are of identical form, the description of one will suffice for both. Each of these jaw members comprises, as shown in Fig. 5, a hollow rectangular box-like structure consisting of upper and lower plates 25 and 26 having side plates 27 and 28 secured thereto. As shown in Fig. 5, this structure is slidably mounted on the members 18 and 19. The side plates 27 and 28 extend downwardly below the beam and between these members is mounted the jaw 30. It is sometimes desirable to have the jaw movably mounted with respect to the jaw support or carrier, and this may be provided in the present instance by slots 31 in the plates 27 and 28 and pins 32 in the jaw slidably received in these slots.

The plates 25 and 26 are provided with openings 33 and 34 which receive the ends 35 and 36 of a threaded nut 37, which nut, as is shown in Fig. 5, lies between the beam elements 18 and 19.

As shown more especially in Fig. 6, a bearing designated generally at 38 is secured between the members 18 and 19, which bearing, together with the bearing at the other end of the beam element, supports the screw 39. This screw is provided with a right-hand thread at one end and a left-hand thread at the other and is threadedly received in the nuts 37 so that rotation of the screw in one direction will cause the jaw members to slide inwardly on the beam element and rotation in the other direction will effect outward movement of the jaws. Intermediate its end the screw is provided with a bearing in a bracket 40 supported by the members 18 and 19 (Figs. 1 and 4).

Guide rods 70 are secured at one end to the plates 15 and 16 on each side of the beam element and the other ends of these rods are slidably received in ears 71 secured to the side plates 27 and 28 of the jaw members. Nuts 72 on these rods limit the outward movement of the jaw members.

A second screw 42 also having right- and left-hand threads is rotatably supported by bearings 42ª in the plates 15 and 16 and by a bracket 43 mounted upon the members 18 and 19. The threads of this screw are threadedly received in nuts 44 secured to the inner jaw members which are, as shown in Fig. 1, adapted to enter the opening in the coil and grip the latter at its inside diameter. As these two jaws are of identical form, the description of one will suffice for both.

Secured to each of the nuts 44 are L-shaped members 45 and 46 welded together below the beam to form a U-shaped structure. Hangers 47 formed integrally with the members 45 and 46 and with welded plates 46ª supported by these members project downwardly therefrom and serve to support the jaw 48. The jaws 48, as shown in Fig. 2, are of arcuate form, being outwardly convex so as to fit against the periphery of the opening in the coil. It may here be noted that the outer jaws 30, as shown in Fig. 2, are of angular or concave form so as to embrace properly the outer surface of the coil.

A motor 50 is supported upon the plate 10, the shaft 51 of which is connected by a chain 52 to a shaft 53 carried in a gear casing 54 also supported by the supporting plate. The shaft 53 (Fig. 3) carries a worm 55 in mesh with a worm wheel 56 mounted upon a shaft 57. This shaft extends from the gear casing at both ends (Fig. 1), and upon the projecting ends of the shaft are provided sprocket wheels 58 and 59 connected to the shaft by friction clutches 60 and 61 so that normally these sprocket wheels will be driven when the shaft rotates but will be allowed to slip with respect to the shaft when sufficient resistance to rotation is encountered.

The sprocket wheel 58 is connected to a sprocket wheel 62 on the screw 42 by a chain 63, and the sprocket wheel 59 is similarly connected to a sprocket wheel 64 on the screw 39 by the chain 65. With this construction it will be seen that, while the screws 39 and 42 are both driven by the same motor, they are driven independently through the friction clutches so that when one screw meets with sufficient resistance, its movement may be checked, and in such event the other screw may continue its rotation. The motor 50 will preferably be of the reversible type so that the jaws, both outer and inner, may be driven in opposite directions.

In Fig. 1 of the drawings the jaws are shown in the extreme open position, the inner jaws being in close juxtaposition and the outer jaws being at the outer ends of the screw 39. If the motor is set into operation in the proper direction, the inner jaws 48 will be moved outwardly to engage the inner surface of the coil and simultaneously the outer jaws will be moved inwardly to engage its outer surface. If, for example, the inner jaws engage the inner surface of the coil before the outer jaws engage its outer surface, the clutch 60 will slip and permit the continued movement of the outer jaws until they bring up against the outer surface of the coil and in cooperation with the inner jaws grip both rims thereof. Similarly, if the outer jaws bring up against the outer surface of the coil first, the inner jaws will be permitted to continue their outward movement until they engage the inner surface of the coil. Thus regardless of the dimensions of the coil, particularly with regard to its thickness, both rims will be securely gripped by the jaws of the grapple.

While I have shown and described one embodiment of my invention, it will be understood that it is not to be limited to all of the details shown, but is capable of modification and variation within the spirit of the invention and within the scope of the claims.

What I claim is:

1. A grapple comprising a supporting frame, an elongated beam supported thereby in a substantially horizontal position, a pair of outer jaws slidably supported on said beam, a pair of inner jaws slidably supported on the beam between said outer jaws, each of which opposes and cooperates with an associated outer jaw to grip an artcle between said jaws, means operatively connected to said outer jaws to effect approaching and separating movements thereof, means operatively connected to said inner jaws to effect approaching and separating movements thereof, a single motor on the frame and operatively connected to both said means to actuate the same, and the connections from the motor to one of said moving means including a friction clutch to provide for movement of one pair of jaws when movement of the other pair is checked by engagement with the article to be gripped.

2. A grapple comprising a supporting frame, an elongated beam supported thereby in a substantially horizontal position, a pair of outer jaws movably slidably supported on said beam, a pair of inner jaws slidably supported on the beam between said outer jaws, each of which opposes and cooperates with an associated outer jaw to grip an article between said jaws, a motor supported by the frame, independent means connecting said motor to each pair of jaws to move the same, both said connecting means being connected to said motor for actuation thereby, and each of said connecting means comprising a friction clutch element to permit movement of one pair of jaws independently of the other pair.

3. A grapple comprising a supporting frame, an elongated beam supported thereby in a substantially horizontal position, a pair of outer jaws slidably supported on said beam, a pair of inner jaws slidably supported on each of which opposes and cooperates with an associated the beam between said outer jaws, each of which opposes and cooperates with an associated outer jaw to grip an article between said jaws, a screw threadedly connected to said outer jaws to move them in opposite directions, a second screw threadedly connected to said inner jaws to move the latter in directions opposite to that of the cooperating outer jaws, a motor supported on the frame having separate connections to said screws to rotate the latter, and a friction clutch in each of said connections.

4. A grapple comprising a supporting frame, an elongated beam suspended from the frame in a substantially horizontal position and comprising spaced members rigidly secured together, a pair of outer jaws and a pair of inner jaws slidably supported between said members, a screw rotatably mounted between said members, a nut secured to each of the outer jaws and threadedly engaged with said screw, a second screw rotatably supported by the frame, and a nut secured to each of the inner jaws and threadedly connected to said second screw, a driving motor supported by the frame, and independent connections connecting said motor to each of said screws to permit independent operation thereof.

5. A grapple comprising a supporting frame, an elongated beam suspended from the frame in a substantially horizontal position comprising spaced members rigidly secured together, a pair of outer jaws and a pair of inner jaws slidably supported between said members, a screw rotatably mounted between said members, a nut secured to each of the outer jaws and threadedly engaged with said screw, a second screw rotatably supported by the frame, a nut secured to each of the inner jaws and threadedly connected to said second screw, a driving motor supported by the frame, independent connections connecting said motor to each of said screws to permit independent operation thereof, and means in said connections to permit movement of one pair of jaws after movement of the other pair has been checked.

6. A grapple comprising a supporting frame, a hollow elongated beam supported by the frame at the lower portion thereof, a pair of outer jaws slidably carried by the beam, a pair of inner jaws slidably carried by the beam, a screw rotatably mounted in the beam, a nut connected to each of the outer jaws in which the screw is threadedly received, a second screw rotatably supported by the frame above said beam, a nut connected to each of the outer jaws in which said second screw is threadedly received, a motor carried by the frame, and independent connections connecting said motor to said screws, each of said connections including a friction clutch to permit independent operation of the screws by said motor.

7. A grapple comprising a supporting frame, said frame having a supporting plate with a pair of spaced plate elements projecting downwardly therefrom, a beam supported by said plate elements and consisting of spaced members rigidly secured together, a pair of outer jaws slidably supported on said beam, a pair of inner jaws slidably supported on said beam, a screw rotatably mounted between said spaced members, a nut secured to each of the outer jaws in which said screw is threadedly received, a second screw rotatably supported by said plate elements, and a nut secured to each of said inner jaws in which said screw is threadedly received, a motor mounted on said supporting plate, a shaft driven by said motor, a gear box on said supporting plate in which said shaft is rotatably mounted, a pair of sprocket wheels mounted on said shaft, each of which is connected to the shaft by a friction clutch, and means drivingly connecting each of said sprocket wheels to one of said screws.

References Cited in the file of this patent

UNITED STATES PATENTS

| | | |
|---|---|---|
| 1,693,074 | Falco | Nov. 27, 1928 |
| 1,807,360 | Wehr | May 26, 1931 |
| 2,284,238 | Todd | May 26, 1942 |
| 2,337,178 | Breslav | Dec. 21, 1943 |
| 2,874,990 | Janoff | Feb. 24, 1959 |
| 2,906,555 | Heppenstall | Sept. 29, 1959 |